J. T. HALL.
Horse-Hay-Fork.
No. 63,719.  Patented April 9, 1867.
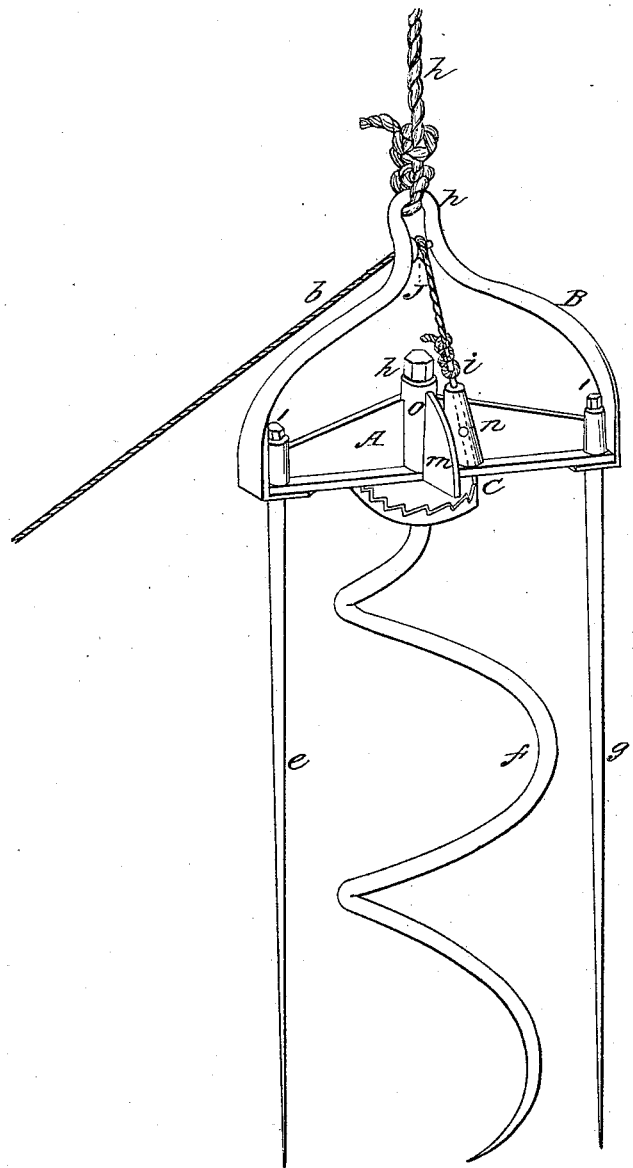
Witnesses:
James McBride.
James Johnston.
Inventor:
James T. Hall

United States Patent Office.

JAMES T. HALL, OF TRENTON, NEW YORK, ASSIGNOR TO HIMSELF AND JOHN T. AND ISAAC PIERCE, AND H. T. FOWLER.

Letters Patent No. 63,719, dated April 9, 1867.

IMPROVEMENT IN HORSE HAY-FORKS.

The Schedule referred to in these Letters Patent and making part of the same.

TO ALL WHOM IT MAY CONCERN:

Be it known that I, JAMES T. HALL, of Trenton, in the county of Oneida, in the State of New York, have invented a new and useful Improvement in "Hay Elevators," (being an improvement on the "Hay Elevator" of John F. Pierce, patented March 6, 1866;) and I do hereby declare that the following is a full and exact description thereof, reference being had to the accompanying drawings, and to the letters of reference marked thereon.

My invention consists in providing the cross-head with guards, and so combining and arranging a ratchet-wheel and pawl with relation to the spiral tine that it and the straight tines can be forced down into the hay by pressing down on the cross-head; the whole being constructed, arranged, combined, and operating, substantially as hereinafter described.

To enable others skilled in the art to make and use my invention, I will proceed to describe its construction and operation. In the drawing—

A represents the cross-head, which is made of cast iron, and in the form shown in the drawing. On each side, and at right angles to the longitudinal plane of the cross-head, are guards $m$, which extend beyond the ratchet-wheel. The upper edge of the guards is curved and rounded off so that in hoisting the elevator these guards, in connection with the yoke B, will protect the ratchet-wheel, and prevent the elevator from catching on the cross-beams and timbers of the barn or hay-loft. To the cross-head A is attached a yoke, B, which is provided with a pulley, J, and a loop, P. To this loop is attached the hoisting rope $k$. The straight tines $e$ and $g$ are secured in the cross-head by screw-nuts 1. The spiral tine $f$ is provided with the ratchet-wheel C, the teeth of which are bevelled off on the back, so that the tine $f$ and ratchet-wheel can turn in one direction, independent of the action of the pawl $i$, which moves in the part marked $n$ of the cross-head. The upper end of spiral tine $f$ is secured by a screw-nut, $h$, in the part marked $o$ of the cross-head, and so arranged that it will turn with ease. As the construction, arrangement, and the relation that the several parts bear to each other will readily be seen and understood by the skillful mechanic without further description, I will therefore proceed at once to describe the operation of my improved hay elevator.

Having all things constructed, arranged, and combined as herein described and represented, I attach the hoisting rope $k$ to the yoke B, and an unshipping cord $l$ to the pawl $i$. I then force the tines $e$ $g$ and $f$ down into the hay by pressing down on the yoke B and cross-head A. I then raise the elevator to the desired place by drawing on the rope $k$. After the elevator and its load are raised to and carried off to the desired place in the barn or hay-loft, I then pull on the cord $l$ which will unship the pawl $i$ from the teeth of the ratchet-wheel C. I then draw on the yoke B, which will cause the tine $f$ to unwind itself from the hay and thereby relieve the elevator from its load.

The advantage of my invention, as an improvement on the invention of John F. Pierce, consists in providing means for guarding the elevator and ratchet-wheel from catching on the cross-beams and other timbers of the barn or hay-loft, and also making the elevator cheaper, more durable, and less liable to get out of order.

Having thus described the nature, construction, and operation of my improvement, what I claim as of my invention, is—

1. The use of the guards $m$, when used in combination with the cross-head A and yoke B, as herein described and for the purpose set forth.

2. In combination with the above the pawl $i$ and ratchet-wheel C, when used for holding the tine $f$ in a fixed position, as herein described and for the purpose set forth.

JAMES T. HALL.

Witnesses:
JAMES J. JOHNSTON,
A. C. JOHNSTON.